(12) United States Patent
Beust

(10) Patent No.: US 10,798,034 B2
(45) Date of Patent: *Oct. 6, 2020

(54) VIRTUAL CHAT ROOMS

(71) Applicant: Oath Inc., New York, NY (US)

(72) Inventor: Cédric Beust, Sunnyvale, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,415

(22) Filed: Aug. 5, 2019

(65) Prior Publication Data

US 2019/0356619 A1 Nov. 21, 2019

Related U.S. Application Data

(63) Continuation of application No. 16/159,913, filed on Oct. 15, 2018, now Pat. No. 10,374,989, which is a continuation of application No. 15/161,672, filed on May 23, 2016, now Pat. No. 10,104,025.

(51) Int. Cl.
| | |
|---|---|
| *H04L 12/58* | (2006.01) |
| *H04L 29/08* | (2006.01) |
| *H04L 29/06* | (2006.01) |
| *H04W 4/08* | (2009.01) |

(52) U.S. Cl.
CPC ............ *H04L 51/046* (2013.01); *H04L 51/04* (2013.01); *H04L 65/1069* (2013.01); *H04L 67/141* (2013.01); *H04L 67/22* (2013.01); *H04L 67/306* (2013.01); *H04W 4/08* (2013.01)

(58) Field of Classification Search
CPC ..... H04L 12/1818; H04L 51/32; H04L 67/02; H04L 67/22; H04L 51/046; H04L 51/00; H04L 51/02; H04M 1/72552; H04N 21/2347; H04N 21/4788; H04N 7/15; H04W 4/12
See application file for complete search history.

(56) References Cited

U.S. PATENT DOCUMENTS

| | | | |
|---|---|---|---|
| 7,392,290 B1 * | 6/2008 | Duffield ............... | G06Q 10/107 709/206 |
| 7,618,303 B2 * | 11/2009 | Ganz .................. | G06Q 30/0222 446/175 |
| 7,743,096 B2 * | 6/2010 | Bouilloux-Lafont ........................ | H04N 7/17318 709/204 |

(Continued)

*Primary Examiner* — Sargon N Nano
(74) *Attorney, Agent, or Firm* — Cooper Legal Group, LLC

(57) ABSTRACT

One or more computing devices, systems, and/or methods for hosting virtual chat rooms of a chat room are provided. For example, users (e.g., 3,000 users) may access video interfaces, hosting a video, and chat room interfaces associated with a chat room for the video (e.g., users may access a news website providing a live stream of a current event along with a chat room for discussing the live stream). Signals of the users (e.g., a user location, age, account profile information, prior chat room message behavior, etc.) are evaluated to identify user properties (e.g., the user is an active participant within chat rooms). The chat room may be sharded into a set of virtual chat rooms into which users are assigned based upon the user properties (e.g., 300 virtual chat rooms of 100 users each). In this way, users may have more meaningful interactions within the smaller virtual chat rooms.

20 Claims, 10 Drawing Sheets

(56) References Cited

U.S. PATENT DOCUMENTS

| | | | | |
|---|---|---|---|---|
| 8,006,191 B1* | 8/2011 | Anderson | ............ | G06Q 10/107 |
| | | | | 715/751 |
| 8,015,246 B1* | 9/2011 | Anderson | ............. | G06F 3/0481 |
| | | | | 709/204 |
| 8,108,459 B1* | 1/2012 | Hoffman | ............... | H04L 65/403 |
| | | | | 709/203 |
| 8,843,835 B1* | 9/2014 | Busey | ................. | H04L 12/1813 |
| | | | | 715/739 |
| 2004/0111479 A1* | 6/2004 | Borden | ............... | H04L 12/1813 |
| | | | | 709/206 |
| 2006/0184886 A1* | 8/2006 | Chung | ................. | G06Q 10/107 |
| | | | | 715/758 |
| 2007/0255791 A1* | 11/2007 | Bodlaender | ......... | H04L 12/1822 |
| | | | | 709/206 |
| 2008/0082609 A1* | 4/2008 | O'Sullivan | ............. | H04L 51/04 |
| | | | | 709/204 |
| 2012/0254774 A1* | 10/2012 | Patton | .................... | H04L 51/20 |
| | | | | 715/758 |
| 2012/0290950 A1* | 11/2012 | Rapaport | ................ | H04L 51/32 |
| | | | | 715/753 |
| 2016/0203831 A1* | 7/2016 | Elyashiv | ................. | G10L 25/63 |
| | | | | 704/270 |
| 2017/0041263 A1* | 2/2017 | Shekel | .................... | H04L 51/12 |

* cited by examiner

VIRTUAL CHAT ROOMS

CROSS REFERENCE TO RELATED APPLICATIONS

This application claims priority to and is a continuation of U.S. application Ser. No. 16/159,913, filed on Oct. 15, 2018, entitled "VIRTUAL CHAT ROOMS", which claims priority to and is a continuation of U.S. application Ser. No. 15/161,672, filed on May 23, 2016, entitled "VIRTUAL CHAT ROOMS". U.S. application Ser. No. 16/159,913 and U.S. application Ser. No. 15/161,672 are both incorporated herein.

BACKGROUND

Many users may consume content through user interfaces, such as a video accessible through a video interface. For example, the video may comprise a movie, a television show, a live stream of a sporting event, a webcast, prerecorded video, etc. Users that are watching the video may be provided with a chat room interface through which the users may interact while watching the video. For example, the users may discuss the video with other users within the chat room by writing and reading messages through the chat room interface.

The chat room may grow to a significant number of users as more users watch the video (e.g., thousands of users may be within a chat room for discussing an e-sporting event video stream). Unfortunately, the chat room may become overwhelming to the point that users are unable to have meaningful interactions. Users may be unable to single out and/or participate in a certain conversation because text of the chat room may scroll too fast. Thus, users may become overwhelmed, and the chat room may become useless. Also, the chat room interface may experience performance issues such as lag due to resource strain, such as bandwidth consumption and client device resource consumption, from attempting to keep the chat room interface up-to-date with all the messages being generated by the thousands of users.

SUMMARY

In accordance with the present disclosure, one or more computing devices and/or methods for hosting virtual chat rooms for a chat room are provided. In an example, users that are accessing video interfaces, hosting a video, and chat room interfaces associated with a chat room for the video may be identified (e.g., 3,000 users may be watching a live stream of a sporting event through a webpage comprising a video interface for the live stream and a chat interface for a chat room through which the users may communicate about the sporting event). Signals, associated with the users, may be evaluated to identify user properties of the users. For example, user account data (e.g., a user may log into a service through which the video is provided), social network profile data (e.g., a user age, a user home location, a user demographic, an interest of the user such as in soccer, a career of the user such as a soccer coach, a social network post with an image about a restaurant, etc.), a current location of a user device, how a user previously interact with chat rooms (e.g., a user tends to write 0.06 messages per minute and thus is a passive participant; a user tends to write 2 messages per minute and thus is an active participant; a user tends to get into arguments with other users; etc.), keywords or grammar used by a user (e.g., the user uses a lot of exclamation points, the user tends to use profanity, the user tends to write incomplete sentences or phrases, etc.), a contact list of a user (e.g., the user may desire to be within a virtual chat room with other friends or contacts), and/or a variety of other signals may be used to identify user properties indicative of how the user may interact with other users within a virtual chat room (e.g., the user may be a passive participant that uses proper grammar and tends to interact well with adults).

The chat room may be sharded (e.g., partitioned) into a set of virtual chat rooms. For example, the chat room may be sharded and/or users may be assigned to virtual chat rooms based upon a virtual chat room occupancy metric (e.g., a maximum number of occupants for a virtual chat room may be set to 100 users or any other number of users so that users can have meaningful conversations without being overwhelmed) and/or based upon percentages of active participants and passive participants (e.g., a virtual chat room may be defined to have a composition of about 10% or any other percentage of active participants and about 90% or any other percentage of passive participants so that the virtual chat room is not overwhelmed with messages from too many active participants and is not too quiet from too many passive participants).

Users may be assigned to virtual chat rooms of the set of virtual chat rooms based upon the user properties. For example, users may be assigned to a virtual chat room so that the virtual chat room has no more than 100 users and has a composition of about 10% or any other percentage of active participants and about 90% or any other percentage of passive participants. In an example, if a first user and a second user previously interacted with one another in a chat room, then the first user and the second user may be assigned to the same virtual chat room. In another example, if a first user and a second user are similar in age or location, then the first user and the second user may be assigned to the same virtual chat room. In another example, users with similar grammar usage (e.g., the user of complete sentences or incomplete sentences, the use of certain keywords, the use of proper grammar or not, the user of statements that invoke a lot or a little reaction, the use of long or short statements, the user of emoticons or exclamation marks, etc.) may be assigned to the same virtual chat room. In this way, users may be assigned to virtual chat rooms to provide a chat room composition that facilitates meaningful and interactive conversations between users. Users may be provided with access to their assigned virtual chat rooms through the chat room interfaces (e.g., messages displayed through a chat room interface may be filtered to message of other users assigned to the same virtual chat room).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
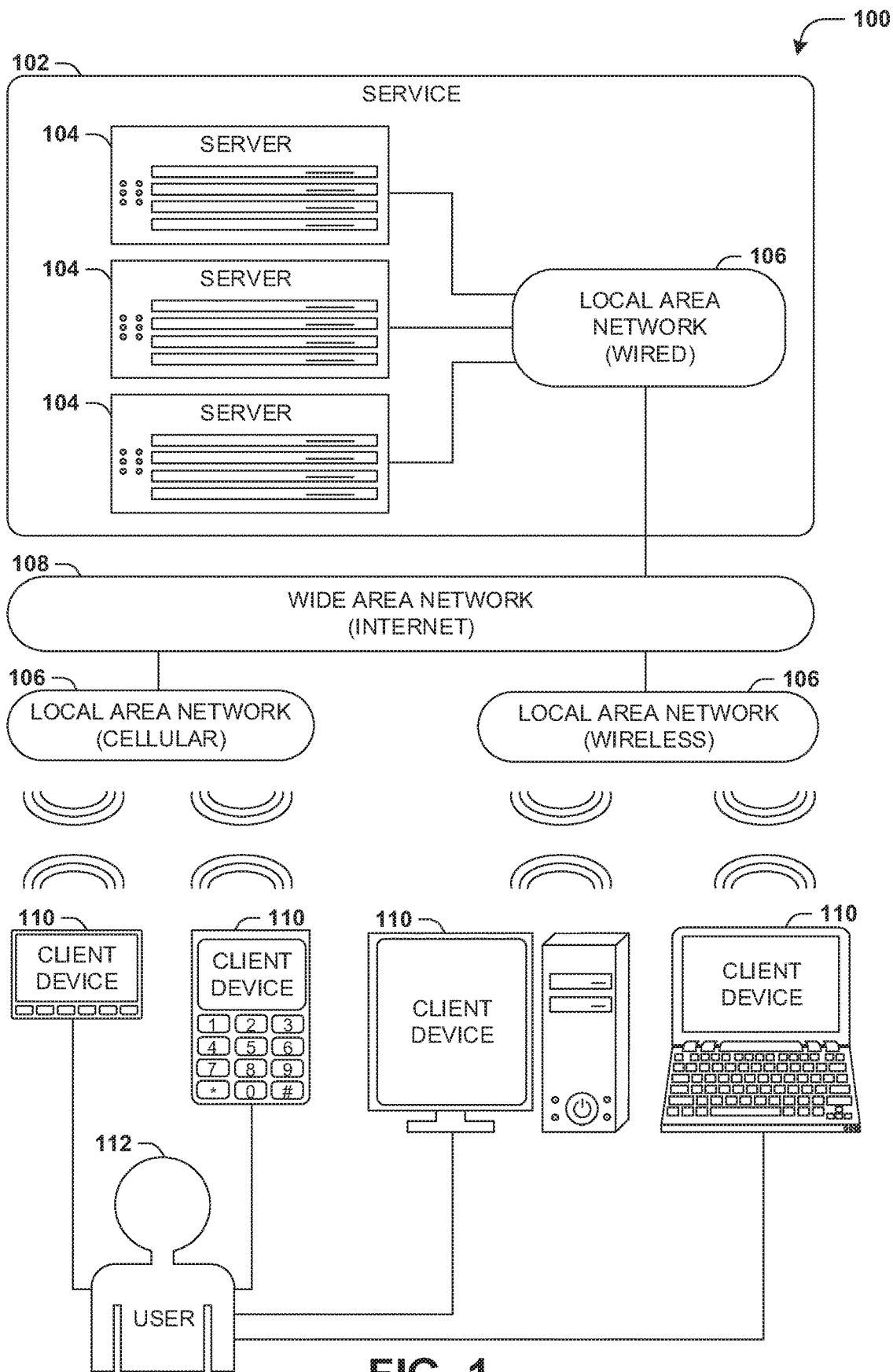
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
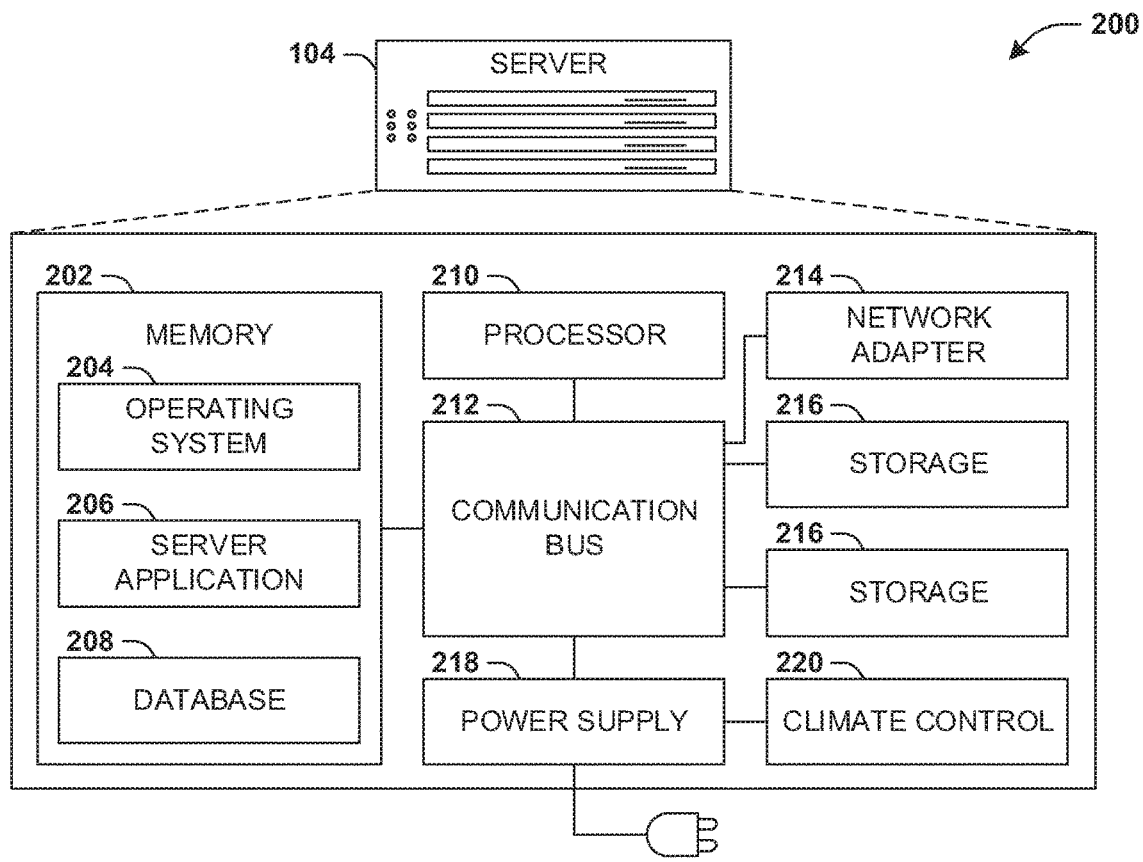
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
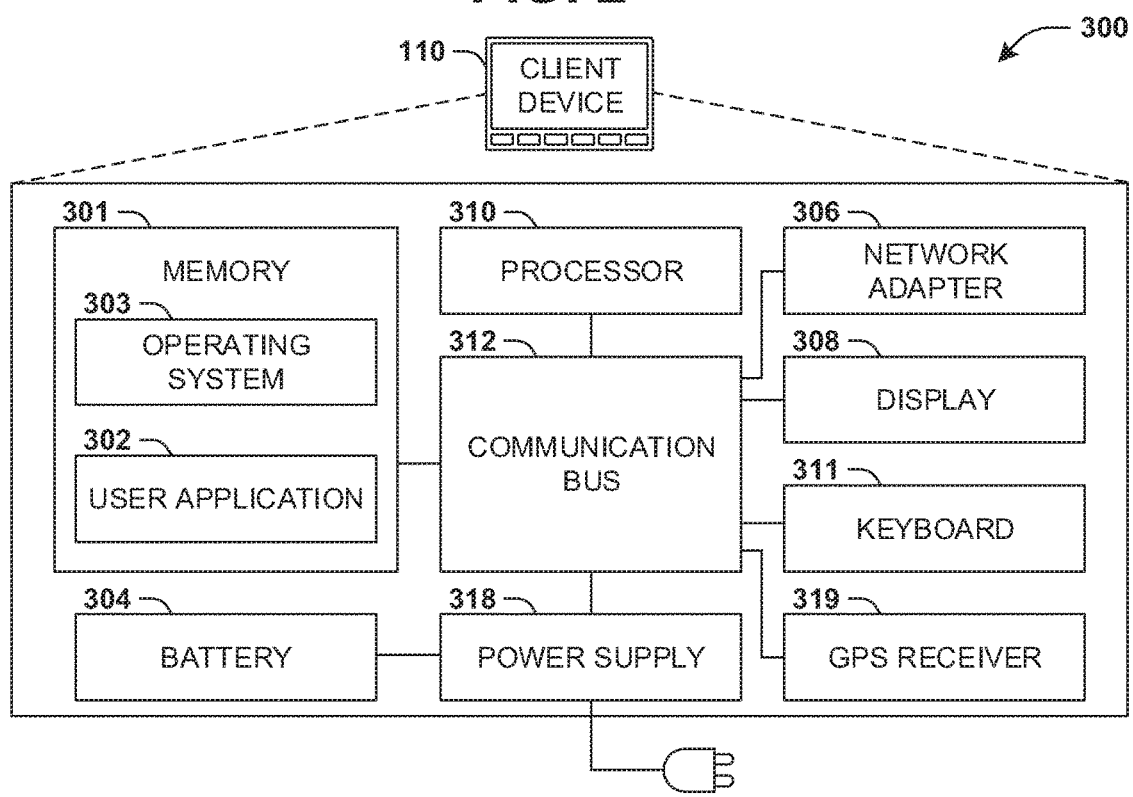
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time)

may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for hosting virtual chat rooms for a chat room are provided. A user may access a video through a video interface. A chat room may be provided to the user through a chat room interface for discussing the video with other users watching the video. Unfortunately, as the number of users watching the video grow, the chat room may become overwhelming due to the number of users posting messages through the chat room. For example, messages may scroll so fast that the user is unable to read or follow messages of a conversation. Thus, the user may be unable to engage in meaningful conversation because messages of the user may scroll too fast for other users to view. The chat room may lag from the amount of resources (e.g., network bandwidth and computing resources of a client device, a server hosting the chat room, etc.) necessary to receive, process, send, and/or display messages through chat room interfaces (e.g., a client device may be unable to receive hundreds of messages every few seconds over a network and update the chat room interface without lag). Thus, users of the chat room may be unable to have meaningful interaction. Accordingly, as provided herein, the chat room may be sharded into a set of virtual chat rooms (e.g., 50,000 users of the chat room may be split into virtual chat rooms of 100 users each) so that the users may have more meaningful interactions without undue lag from inadequate resources otherwise needed to process a burdensome amount of messages through chat room interfaces (e.g., bandwidth, memory, and/or other computing resources of a client device may be unable to adequately process and display messages of the 50,000 users through a chat room interface without significant lag or other issues).

In an example, a chat room may correspond to an overall grouping of users for which messaging functionality is to be provided through chat room interfaces associated with a particular video being accessed by such users. Thus, messages generated by such users may be processed by data structures and/or chat room functionality of the chat room. Instead of displaying all messages generated by the users of the chat room through the chat room interfaces, the chat room is sharded into virtual chat rooms (e.g., a grouping of users assigned to a virtual chat room) so that merely messages of users assigned to a particular virtual chat room are displayed through chat room interfaces accessed by those assigned users. Thus, the virtual chat room corresponds to a subset grouping of users where messages generated by users of the chat room that are not assigned to the virtual chat room are filtered out so that only messages generated by users assigned to the virtual chat room are displayed through chat room interfaces accessed by those assigned users.

Figure 4:
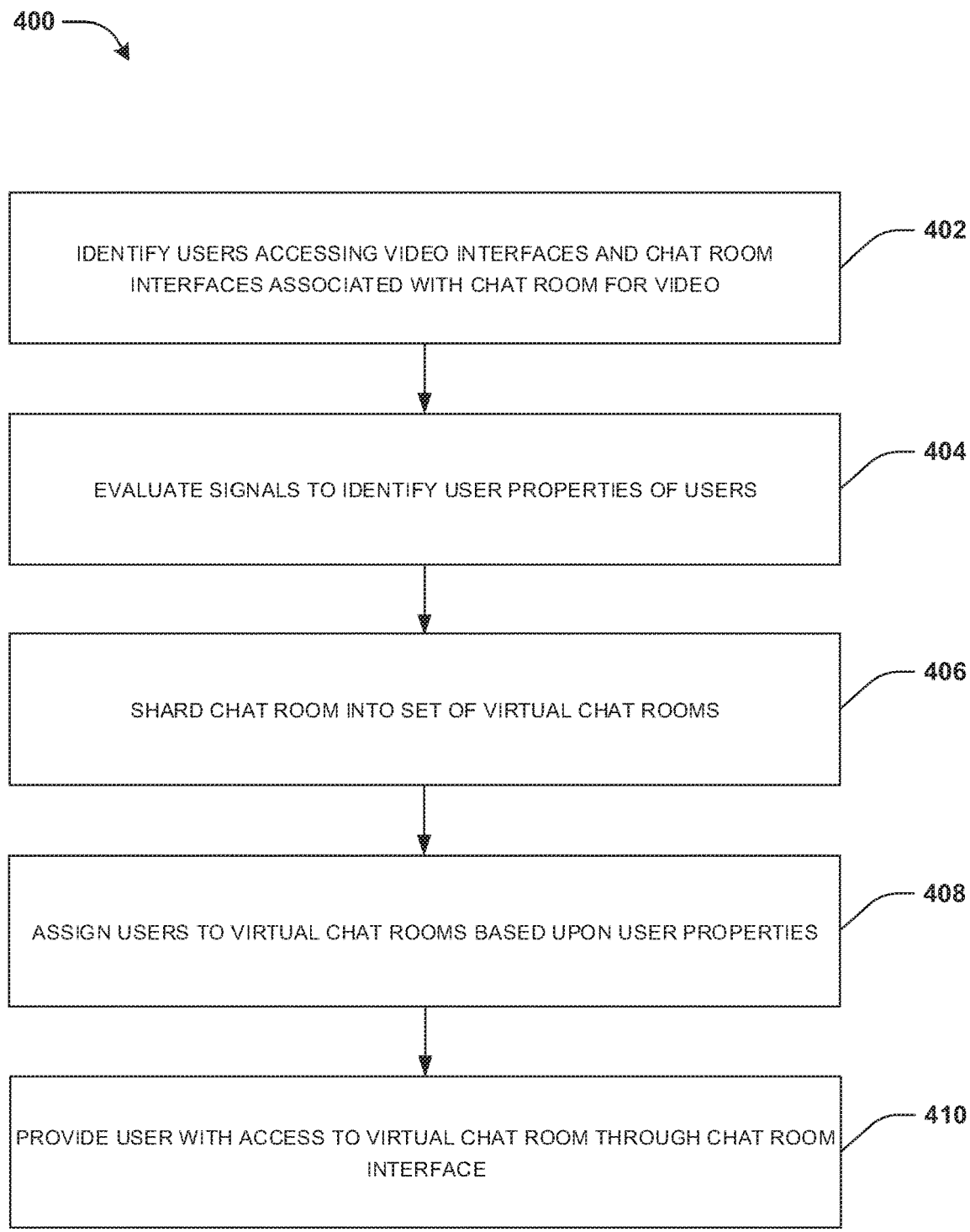
FIG. 4 is a flow chart illustrating an example method for hosting virtual chat rooms for a chat room.

An embodiment of hosting virtual chat rooms for a chat room is illustrated by an example method 400 of FIG. 4. At 402, users accessing video interfaces, hosting a video, and chat room interfaces associated with a chat room for the video may be identified. For example, a user may access a website hosting a video interface through which a live concert video is being streamed. The website may host a chat interface through which the user may communicate with other users watching the concert. At 404, signals, associated with the users, may be evaluated to identify user properties of the users. The signals may comprise social network data of the user (e.g., posts by the user, interests of the user, contacts of the user, etc.), a user account of the user (e.g., an age, a place of residence, etc.), locational information from a client device of the user, previous user interactions with chat rooms or other content (e.g., websites visited by the user, content shared by the user through a social network, etc.), etc. Various techniques, such as image recognition, text recognition, feature extract, and/or other signal or content processing techniques may be used to identify user properties from the signals (e.g., image recognition may evaluate a photo shared by the user through a social network to identify an activity being performed by the user such as playing soccer for identifying a soccer interest user property). The user may take affirmative action, such as providing opt-in consent, to allow access to and/or use of signals (e.g., a web browsing history, a user calendar, device sensor information such as camera data or global positioning system (GPS) data, a contact list, a user account profile, etc.), such as for the purpose of identifying user properties used to assign the user to virtual chat rooms (e.g., where the user responds to a prompt regarding the collection and/or use of such information). The user may also opt-out from providing access to such information and/or data or portions thereof (e.g., access may be provided to a user account maintained with a service that hosts the website, but not to a calendar of the user).

A user property may be indicative of the user being an active participant (e.g., the user generates a threshold number of messages within a timespan, such as averaging 0.4 or more messages per minute), the user being a passive participant (e.g., the user generates less than the threshold number of messages within the timespan), a user interest (e.g., a user social network post indicates that the user is an advocate of animal rights), a user age (e.g., the user is a teenager), a user location (e.g., locational information of a mobile device carried by the user may indicate that the user is located in a particular part of a city), a user chat room topic preference (e.g., the user frequently participates in animal topic chat rooms), user contacts (e.g., contacts and friends of the user within a contacts list), user responses to keywords (e.g., the user responds with certain words indicative of anger when reading messages with certain keywords such as "hunting" or "ivory"), the user's usages of keywords (e.g., the user frequently writes messages with the term "funding"), user engagement with one or more additional chat rooms (e.g., the user is routinely a passive participant in videogame chat rooms), user engagement with one or more additional videos, and/or other information indicative of how the user is likely to interact within chat rooms with certain topics and/or other users.

At 406, the chat room may be sharded (e.g., partitioned) into a set of virtual chat rooms. In an example, the chat room may be sharded based upon a virtual chat room occupancy metric. For example, if the virtual chat room occupancy metric specifies a maximum number of users for a virtual chat rooms as 100 or any other number, then the chat room may be sharded into virtual chat rooms with no more than 100 users (e.g., if there are 50,000 users accessing the video, then the chat room may be sharded into 5,000 virtual chat rooms). In an example, the chat room may be sharded and/or users may be assigned to virtual chat rooms based upon a percentage of active participants and a percentage of passive participants (e.g., a virtual chat room may be defined to have a composition of 14% or any other percentage of active participants and 86% or any other percentage of passive participants so that the virtual chat room is not overwhelmed by messages from too many active participants or is too quiet or uninteresting due to too many passive participants).

At 408, the users may be assigned to virtual chat rooms based upon the user properties. In an example, users may be assigned based upon user properties indicative of whether such users are passive participants or active participants so that a virtual chat room has a desired composition of passive participants and active participants. In another example, a first user and a second user may be assigned to the virtual chat room based upon the first user and the second user having previously interacted (e.g., the first user and the second user attended the same school, are contacts of one another, are social network friends, have messaged one another within a chat room, etc.). In another example, a first user and a second user may be assigned to the virtual chat room based upon the first user and the second user sharing a user interest (e.g., a first user property of the first user and a second user property of the second user may indicate that both users have an interest in discussing how to best protect endangered wildlife). It may be appreciated that users may be assigned to the same or different virtual chat rooms based upon various properties, such as two users living within a threshold distance of one another or users being within an age range threshold of one another.

At 410, responsive to a user being assigned to a virtual chat room, the user may be provided with access to the virtual chat room through a chat room interface accessed by the user. In an example, the chat room interface may be populated with chat room information corresponding to the chat room (e.g., the chat room interface may display a total number of users assigned to all the virtual chat rooms, such as the 50,000 users, as opposed to just statistics of the virtual chat room), which may give the user the appearance as though the user is interacting with more than just the users assigned to same virtual chat room as the user. Messages of the chat room (e.g., messages of the 50,000 users) may be filtered for display through the chat room interface based upon messages of users that are assigned to the virtual chat room (e.g., the user may merely see messages from the other 99 users assigned to the same virtual chat room).

Users may be reassigned between virtual chat rooms for various reasons. In an example, activity within the virtual chat room may be monitored. A second user may be reassigned from a second virtual chat room to the virtual chat room based upon the activity. For example, the activity may be indicative of user message activity, of users assigned to the virtual chat room, being below a threshold, and thus the second user (e.g., an active participant that creates a threshold number of messages within a certain timespan) may be assigned to the virtual chat room to increase user message activity. Similarly, if too much user message activity is occurring within the virtual chat room which may be overwhelming for users, then an active participant of the virtual chat room may be reassigned to a different virtual chat room. User message activity may be determined based upon a length and/or number of messages being posted to the virtual chat room.

In another example, user activity of the user within the virtual chat room may be monitored (e.g., keywords used by the user, reactions by other users to messages posted by the user, a length and/or number of messages posted by the user, whether the user is scrolling back through messages to read them or is not interacting with the chat room interface such as where a different user interface is active, etc.). The user may be reassigned from the virtual chat room to a second virtual chat room based upon the user activity. For example, the user may be reassigned based upon the user activity being indicative of a deviation in user behavior from a predicted user behavior (e.g., the user may have been initially identified as being an active participant but may actually be a passive participant that has not posted a message within 10 minutes). In an example, the user may be reassigned based upon the user activity being indicative of the user generating messages identified as having a negative social dynamic impact upon the virtual chat room (e.g., the user is using certain keywords, profanity, or other message content that may illicit negative responses from other users or may offend other users). In another example, users may be reassigned from the virtual chat room to a second virtual chat room based upon an occupancy of the second virtual chat room falling below an occupancy threshold.

In an example, a new user accessing a video interface hosting the video may be identified. Signals of the new users may be evaluated to identify user properties of the new user. The new user may be assigned to the virtual chat room based upon the user properties of the new user (e.g., the new user may be assigned to the virtual chat room based upon the new user having previously interacted with other users assigned to the virtual chat room) and the virtual chat room having an occupancy not exceeding an occupancy threshold.

In an example, a new user accessing a video interface hosting the video may be identified. The new user may be assigned to a testing virtual chat room (e.g., because little to no signals of the new users are available to identify user properties of the new user). User activity of the new user within the testing virtual chat room may be monitored to identify a user property of the new user (e.g., the new user may be an active participant that uses complete sentences and proper grammar). The new user may be assigned to the virtual chat room based upon the user property (e.g., the new user may be added as another active participant for the virtual chat room in order to achieve a desired percentage composition of active participants for the virtual chat room; other users within the virtual chat room may use complete sentences and proper grammar, which may be desired by the new user; etc.)

In an example, user activity of the user within the virtual chat room may be monitored to create a user chat room activity signal. The user chat room activity signal may be stored for subsequent evaluation for identifying user properties of the user. Responsive to the user accessing a second virtual interface, hosting a second video, and a second chat room interface associated with a second chat room for the second video, the user may be assigned to a second virtual chat room for the second chat room based upon the user chat room activity signal.

Figure 5A:
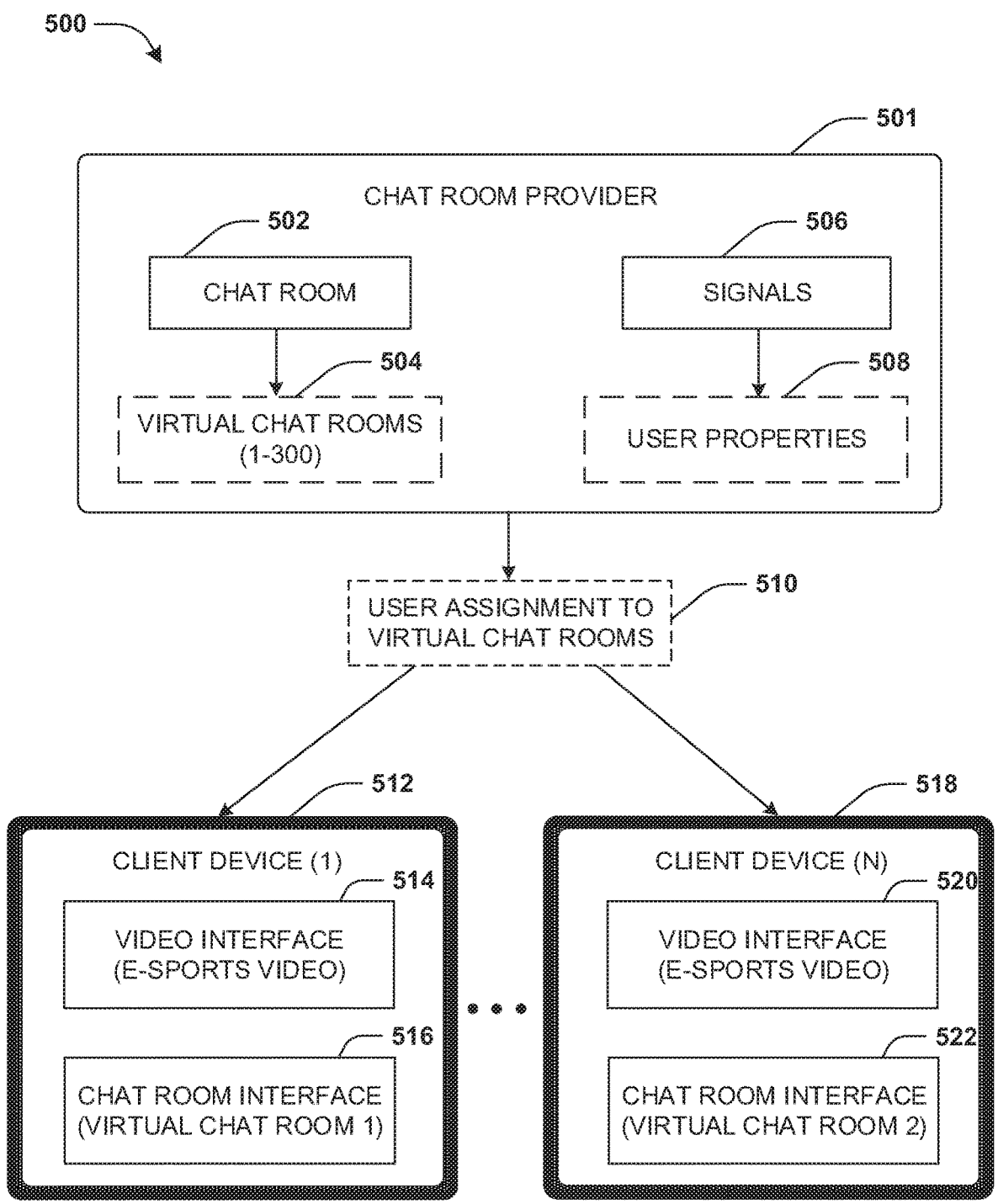
FIG. 5A is a component block diagram illustrating an example system for hosting virtual chat rooms for a chat room, where users are assigned to virtual chat rooms.

FIGS. 5A-5F illustrate examples of a system 500 for hosting virtual chat rooms for a chat room. FIG. 5A illustrates a chat room provider 501 that may be configured to provide users with access to a chat room 502 through which the users may discuss a video. For example, a first user may use a first client device 512 to access an e-sports video (e.g., users playing a competitive videogame) through a first video interface 514 (e.g., of an e-sports webpage). A first chat room interface 516 may be provided for the e-sports video (e.g., also displayed within the webpage). In this way, a plurality of users may access video interfaces, hosting the e-sports video, and chat room interfaces associated with a chat room for the e-sports video, such as an nth user using an nth client device 518 to access the e-sports video through an nth video interface 520 and an nth chat room interface 522 for the e-sports video.

The chat room provider 501 may identify the users accessing the video interfaces and the chat interfaces (e.g., users accessing the sports webpage). The chat room provider 501 may evaluate signals 506 (e.g., social network data, user account profiles, previous chat rooms accessed by users, previous videos or other content consumed by users, messages written by users, user interests, user ages, user locations, etc.) of the users to identify user properties 508 of the users (e.g., a user may be an active chat room participant that is an avid race car videogame gamer located within San Francisco).

The chat room 502 may be sharded into a set of virtual chat rooms 504 (e.g., the chat room 502 of 3,000 users may be sharded into 300 virtual chat rooms with 100 users per virtual chat room). The users may be assigned 510 to virtual chat rooms based upon the user properties 508. For example, the first user may be assigned to a first virtual chat room. The first user may be provided with access to the first virtual chat room through the first chat room interface 516 (e.g., messages of the 3,000 users may be filtered such that the first chat room interface 516 merely displays messages of other users assigned to the first virtual chat room). The nth user may be assigned to a second virtual chat room. The second user may be provided with access to the second virtual chat room through the nth chat room interface 222 (e.g., messages of the 3,000 users may be filtered such that the nth chat room interface 222 merely displays messages of other users assigned to the second virtual chat room).

Figure 5B:
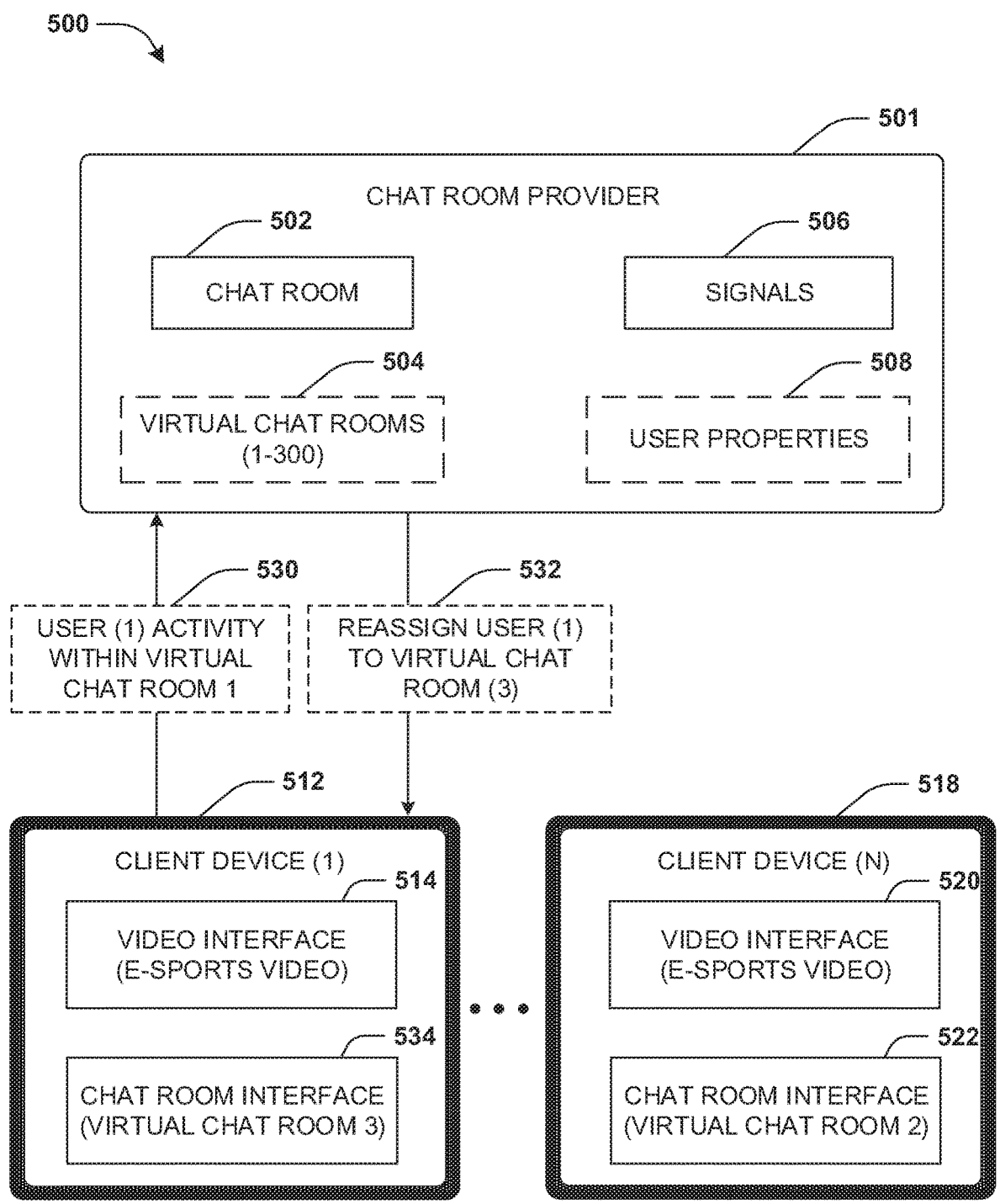
FIG. 5B is a component block diagram illustrating an example system for hosting virtual chat rooms for a chat room, where a first user is reassigned from a first virtual chat room to a third virtual chat room based upon user activity of the first user within the first virtual chat room.

FIG. 5B illustrates user activity 530 of the first user within the first virtual chat room being monitored. For example, the first user may have been assigned to the first virtual chat room as an active participant. However, the user activity 530 may indicate that the first user is not interacting with the other users of the first virtual chat room. Accordingly, the first user may be re-categorized as a passive participant, and reassigned 532 from the first virtual chat room to a third virtual chat room that would provide improved chat room user experience having another passive participant (e.g., the first chat room interface 516 may be updated to display messages of the third virtual chat room, resulting in an updated first chat room interface 534).

Figure 5C:
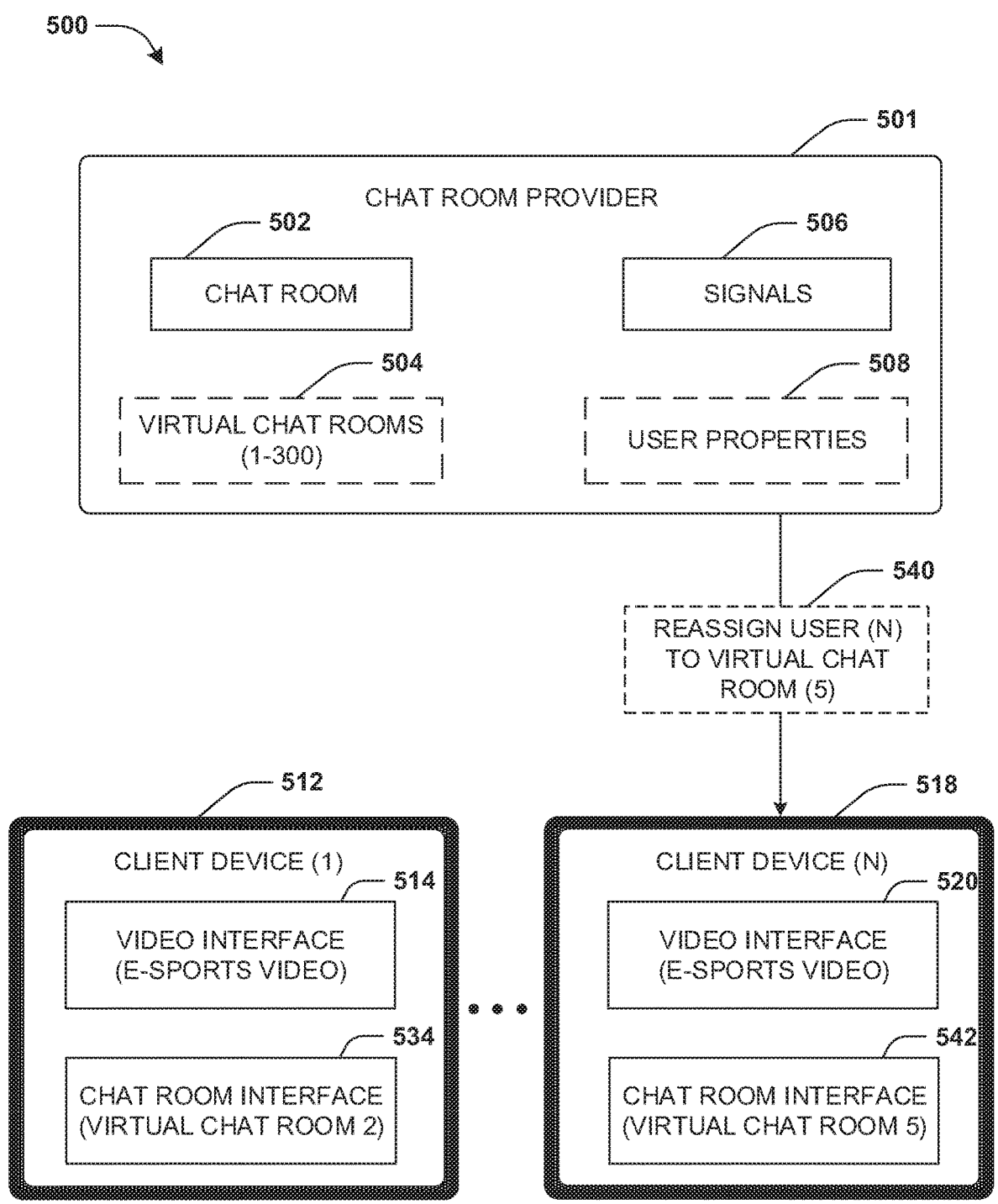
FIG. 5C is a component block diagram illustrating an example system for hosting virtual chat rooms for a chat room, where an nth user is reassigned from a second virtual chat room to a fifth virtual chat room.

FIG. 5C illustrates the nth user being reassigned 540 from the second virtual chat room to a fifth virtual chat room based upon a friend of the nth user recently joining the fifth virtual chat room. The nth chat room interface 522 may be updated to display messages of the fifth virtual chat room, resulting in an updated nth chat room interface 542. In this way, users may be dynamically reassigned between virtual chat rooms based upon up-to-date virtual chat room information (e.g., a number of active participants, a number of passive participants, a current total number of assigned users, a number of messages being posted to a virtual chat room, content of messages being posted to the virtual chat room, etc.).

Figure 5D:
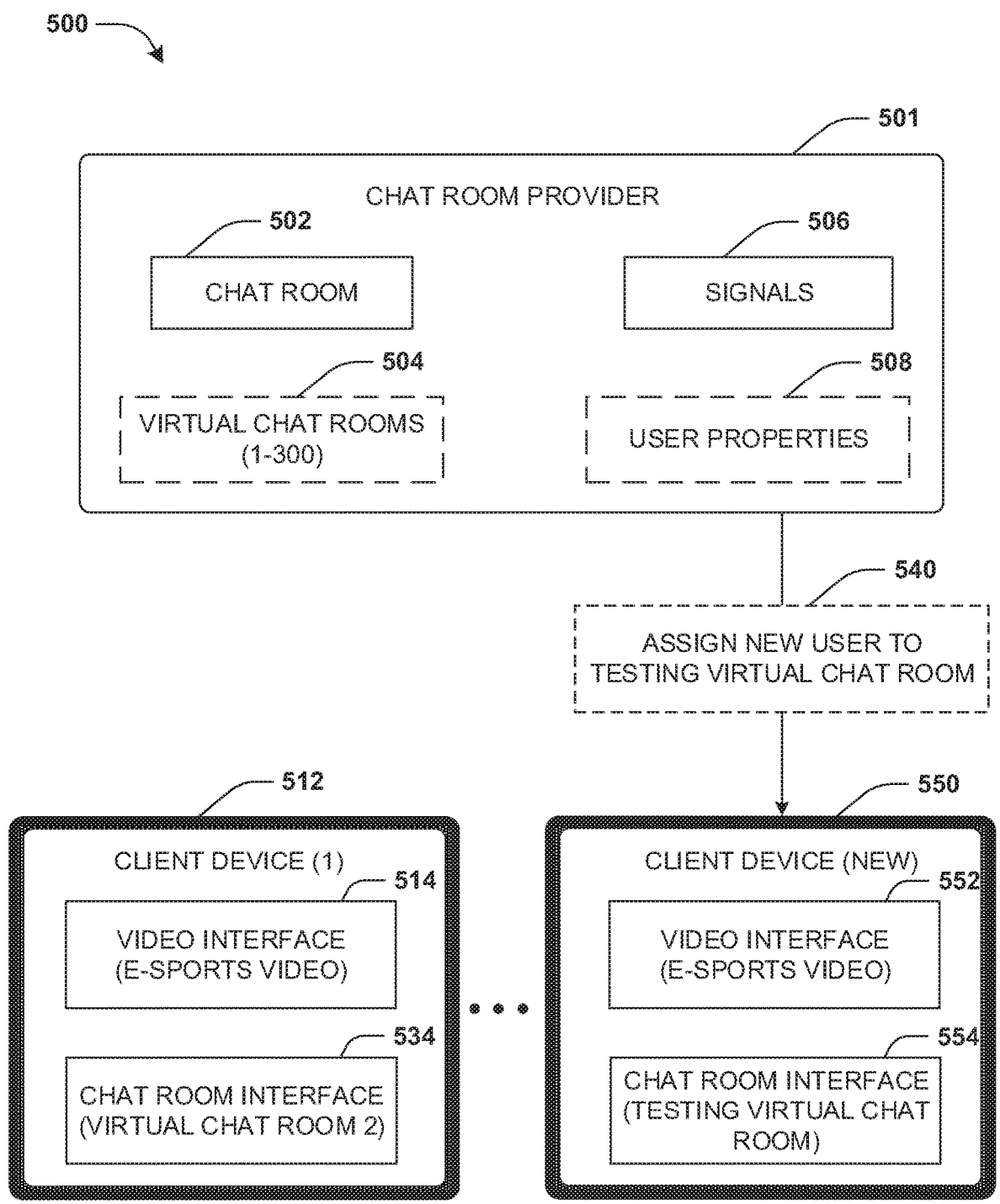
FIG. 5D is a component block diagram illustrating an example system for hosting virtual chat rooms for a chat room, where a new user is assigned to a testing virtual chat room.
Figure 5E:
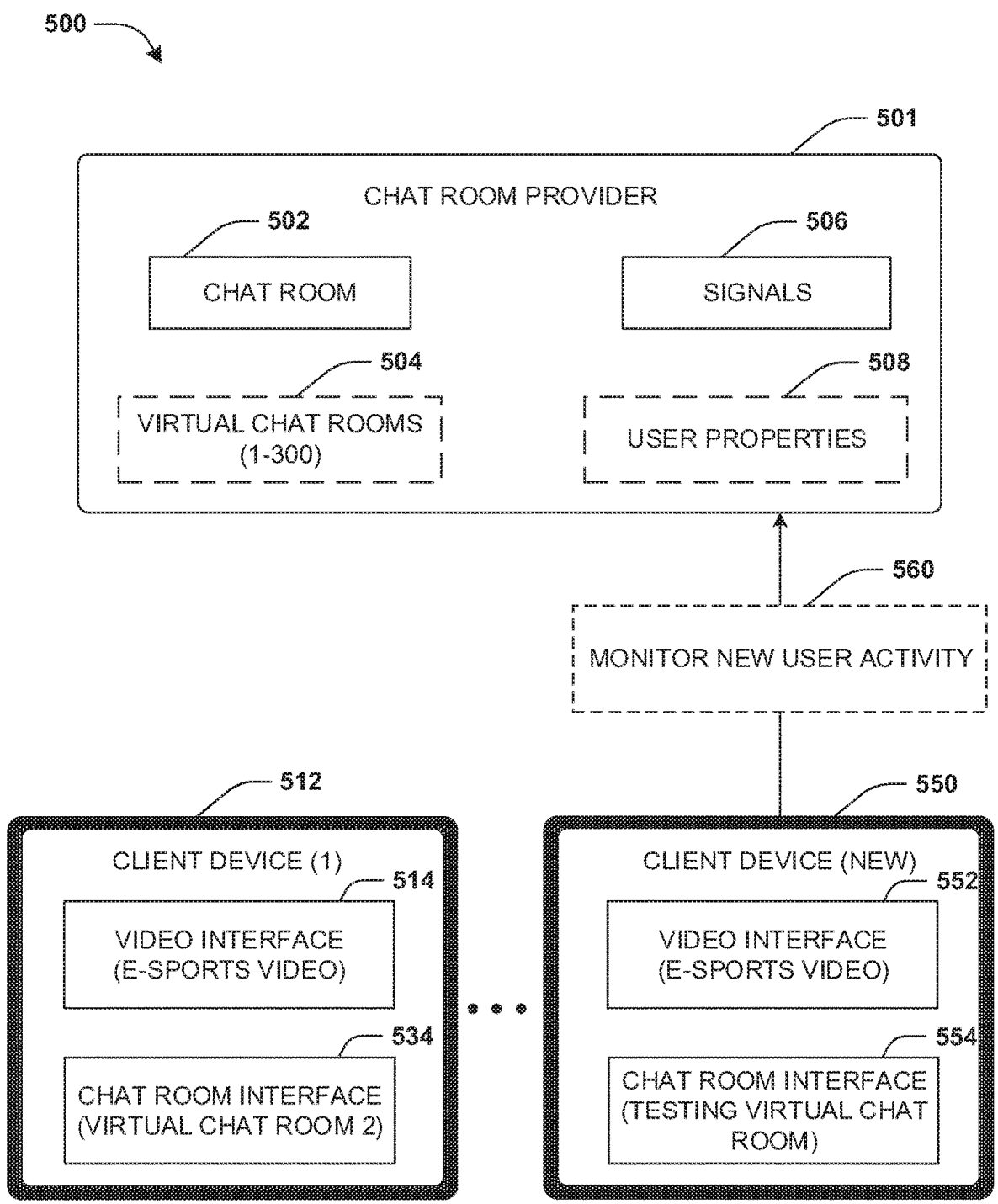
FIG. 5E is a component block diagram illustrating an example system for hosting virtual chat rooms for a chat room, where new user activity of a new user within a testing virtual chat room is monitored.
Figure 5F:
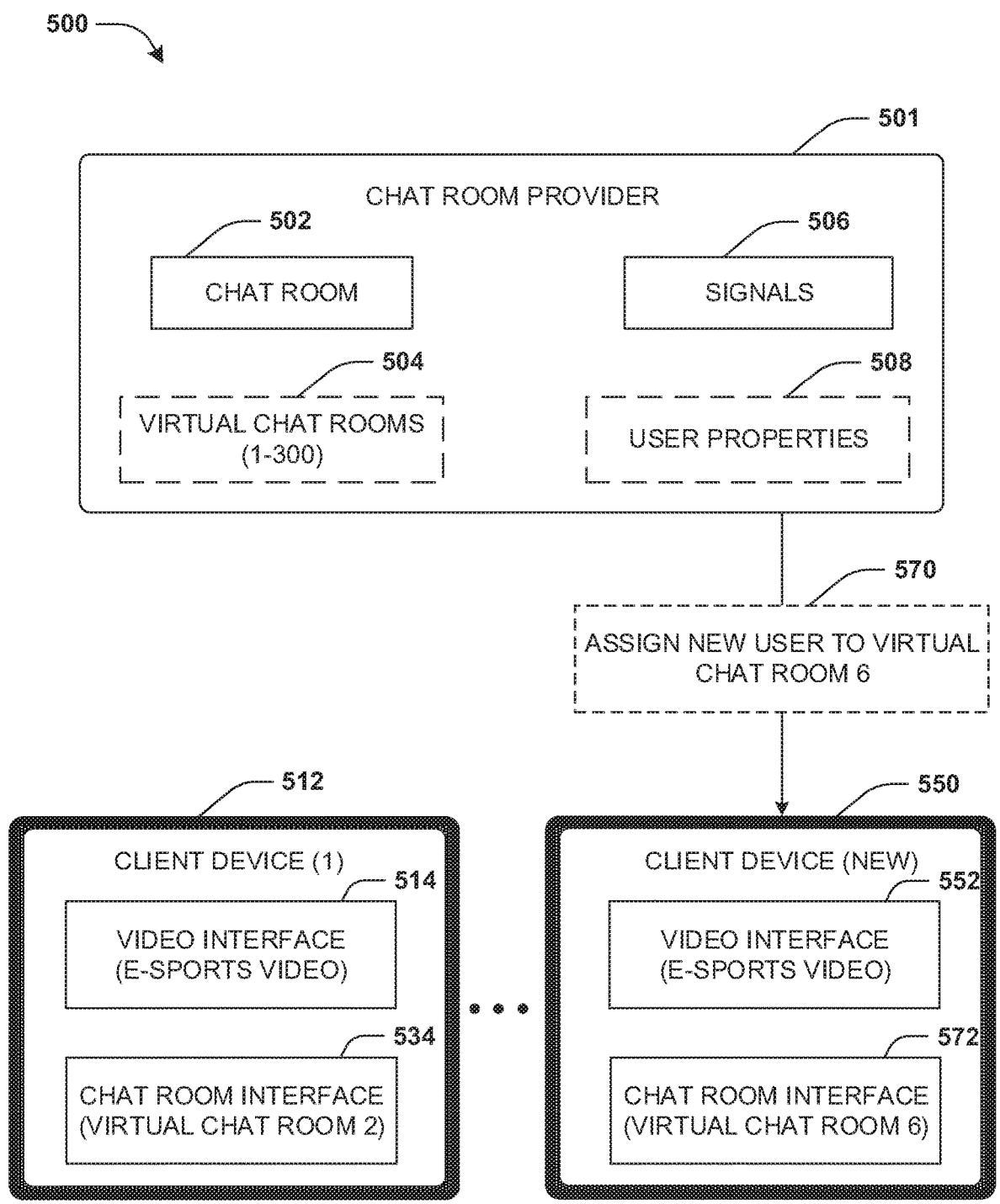
FIG. 5F is a component block diagram illustrating an example system for hosting virtual chat rooms for a chat room, where a new user is assigned to a sixth virtual chat room.

FIG. 5D illustrates a new user using a new client device 550 to access the e-sports video through a new first video interface 552. The new user may be assigned to a testing virtual chat room within which users are monitored to identify user properties of such user, such as the use of proper grammar, use of explicit language, use of long or short sentences, a number of messages per minute generated, user interests or demographic information described by the user through messages, etc. The new user may be provided with access to the testing virtual chat room through a testing chat room interface 554. FIG. 5E illustrates new user activity of the new user being monitored 560 to identify a user property of the new user. For example, the new user may be a very active participant (e.g., the new user created 2 messages per minute) that is a self-proclaimed gamming expert (e.g., features of a message generated by the user may indicate that the user describes herself as a gamming expert). FIG. 5F illustrates the new user being assigned 570 to a sixth virtual chat room based upon the sixth virtual chat room having one or more other users that are gamming experts and the sixth virtual chat room having less than a desired amount of active participants. The testing chat room interface 554 may be updated to display messages of the sixth virtual chat room, resulting in an updated chat room interface 572.

Figure 6:
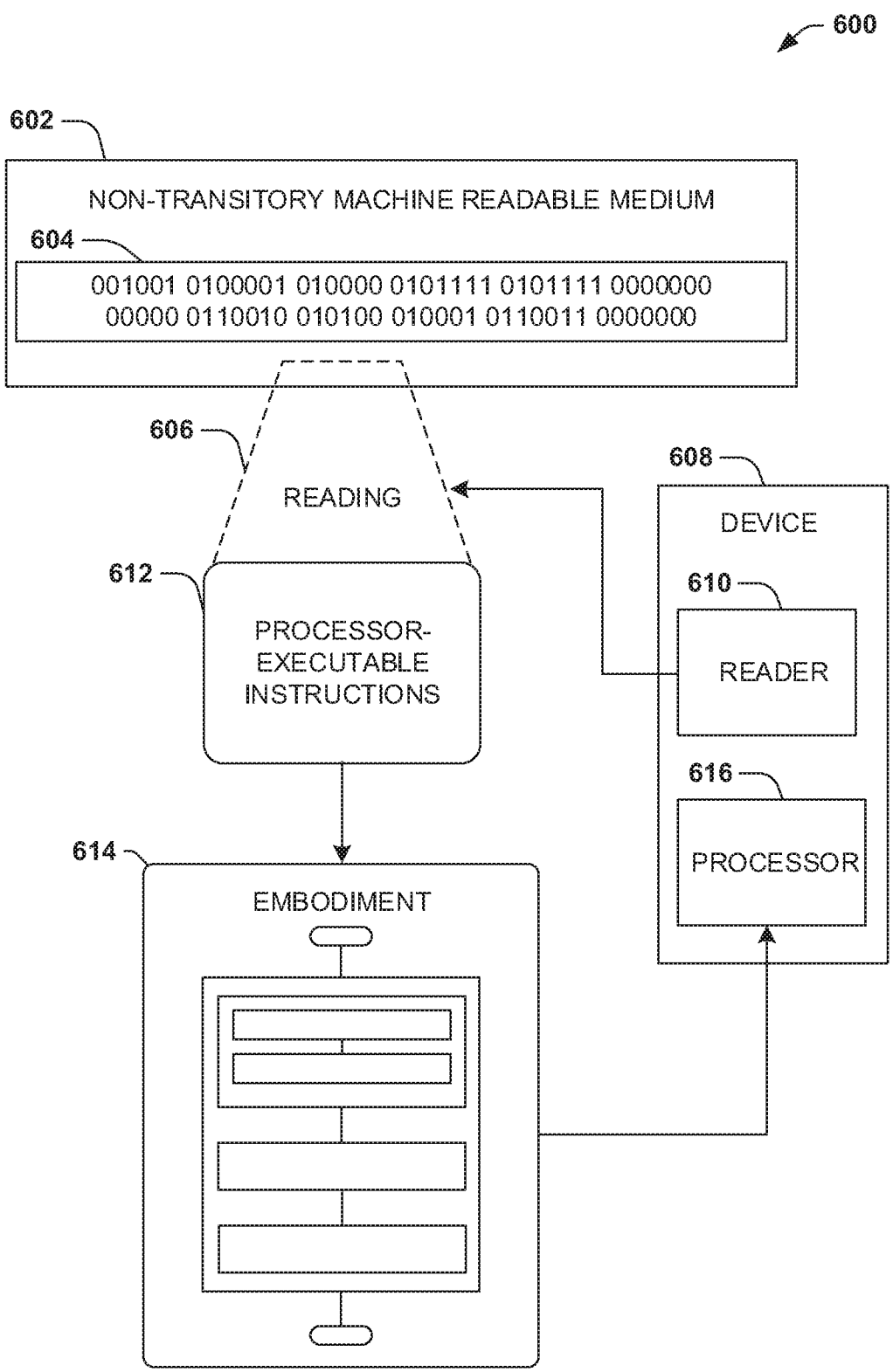
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    identifying computing devices of users accessing video interfaces rendering a video on displays of the computing devices and chat room interfaces associated with a chat room for the video, wherein electronic transmissions of data of the video and the chat room are received by the computing devices over a computer network;
    evaluating signals associated with the users to identify user properties of the users;
    sharding the chat room into a set of virtual chat rooms;
    assigning the users to virtual chat rooms of the set of virtual chat rooms based upon the user properties, wherein the assigning comprises assigning one or more users to a virtual chat room based upon a percentage of active participants and a percentage of passive participants of the virtual chat room; and
    responsive to a user being assigned to the virtual chat room, providing a computing device of the user with access to the virtual chat room through a chat room interface accessed by the computing device of the user over the computer network, wherein the chat room interface is rendered on a display of the computing device.

2. The method of claim 1, wherein the sharding comprises:
    sharding the chat room based upon a virtual chat room occupancy metric.

3. The method of claim 1, comprising:
    monitoring activity within the virtual chat room.

4. The method of claim 1, comprising:
    determining that the user is an active participant based upon the user generating a threshold amount of messages within a timespan.

5. The method of claim 3, comprising:
    reassigning a second user from a second virtual chat room to the virtual chat room based upon the activity.

6. The method of claim 5, wherein the activity is indicative of user message activity, of users assigned to the virtual chat room, being below a threshold.

7. The method of claim 1, wherein the user properties comprise a user property corresponding to user engagement with one or more additional chat rooms.

8. The method of claim 1, wherein the user properties comprise a user property corresponding to user engagement with one or more additional videos.

9. The method of claim 1, wherein the user properties comprise a user property corresponding to an active participant.

10. The method of claim 1, wherein the user properties comprise a user property corresponding to at least one of a user interest, a user age, a user location, user chat room topic preferences, user contacts, user responses to keywords, or user usage of keywords.

11. The method of claim 1, comprising:
    assigning a first user and a second user to the virtual chat room based upon the first user and the second user having previously interacted.

12. The method of claim 1, comprising:
assigning a first user and a second user to the virtual chat room based upon the first user and the second user sharing a user interest.

13. The method of claim 1, comprising:
assigning a first user and a second user to the virtual chat room based upon at least one of the first user and the second user being located within a threshold distance of one another or the first user and the second user being within an age range threshold of one another.

14. The method of claim 1, comprising:
reassigning the user from the virtual chat room to a second virtual chat room based upon an occupancy of the second virtual chat room falling below an occupancy threshold.

15. The method of claim 1, wherein the providing the computing device of the user with access to the virtual chat room comprises:
populating the chat room interface with chat room information corresponding to the chat room; and
filtering messages of the chat room for display through the chat room interface based upon messages of users that are assigned to the virtual chat room.

16. The method of claim 1, comprising:
identifying a new user accessing a video interface hosting the video;
evaluating signals of the new user to identify user properties of the new user; and
assigning the new user to the virtual chat room based upon the user properties of the new user and the virtual chat room having an occupancy not exceeding an occupancy threshold.

17. The method of claim 1, comprising:
identifying a new user accessing a video interface hosting the video;
assigning the new user to a testing virtual chat room;
monitoring user activity of the new user within the testing virtual chat room to identify a user property of the new user; and
assigning the new user to the virtual chat room based upon the user property.

18. The method of claim 1, comprising:
monitoring user activity of the user within the virtual chat room to create a user chat room activity signal;
storing the user chat room activity signal; and
responsive to identifying the user accessing a second virtual interface, hosting a second video, and a second chat room interface associated with a second chat room for the second video, assigning the user to a second virtual chat room for the second chat room based upon the user chat room activity signal.

19. A computer device comprising:
a processor; and
memory comprising processor-executable instructions that when executed by the processor cause performance of operations, the operations comprising:
identifying computing devices of users accessing video interfaces rendering a video on displays of the computing devices and chat room interfaces associated a chat room for the video, wherein electronic transmissions of data of the video and the chat room are received by the computing devices over a computer network;
evaluating signals associated with the users to label the users as either being active participants or passive participants;
sharding the chat room into a set of virtual chat rooms;
assigning the users to virtual chat rooms of the set of virtual chat rooms, wherein a percentage of active participants and a percentage of passive participants are assigned to a virtual chat room; and
responsive to a user being assigned to the virtual chat room, providing a computing device of the user with access to the virtual chat room through a chat room interface accessed by the computing device of the user over the computer network, wherein the chat room interface is rendered on a display of the computing device, wherein the computer device transmits data of the virtual chat room to the computing device over the computer network.

20. A non-transitory machine readable medium having stored thereon processor-executable instructions that when executed cause performance of operations, the operations comprising:
identifying computing devices of users accessing video interfaces rendering a video on displays of the computing devices and chat room interfaces associated a chat room for the video, wherein electronic transmissions of data of the video and the chat room are received by the computing devices over a computer network;
sharding the chat room into a set of virtual chat rooms;
assigning a new user to a virtual chat room;
monitoring user activity of the new user within the virtual chat room;
assigning the new user to a second virtual chat room of the set of virtual chat rooms based upon the user activity; and
providing a computing device of the new user with access to the second virtual chat room through a chat room interface accessed by the computing device of the new user over the computer network, wherein the chat room interface is rendered on a display of the computing device.

* * * * *